United States Patent Office 2,818,362
Patented Dec. 31, 1957

2,818,362

N-VINYL-2-OXAZOLIDONE AND POLYMERIZATION PRODUCTS THEREOF AND METHOD OF MAKING

Erhart K. Drechsel, Springdale, Conn., assignor to American Cyanamid Company, New York, N. Y., a corporation of Maine No Drawing. Application May 18, 1954
Serial No. 430,740

18 Claims. (Cl. 154—43)

This invention relates to a new vinyl monomer, to polymerization products prepared therefrom and to method features. More particularly the invention is concerned with N-vinyl-2-oxazolidone and with polymerization products thereof, including homopolymers and copolymers (or interpolymers), as well as graft polymers. The scope of the invention also includes polymerizable compositions comprising (1) N-vinyl-2-oxazolidone and (2) a compound which is different from the compound of (1) and is copolymerizable therewith and including, for example, (a) compounds containing a $CH_2=C<$ grouping, (b) polymerizable unsaturated alkyl resins containing a plurality of

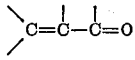

groupings, and mixtures of (a) and (b). Examples of such unsaturated substances are those wherein the substance of (2) is a vinyl compound which is different from N-vinyl-2-oxazolidone, more particularly a vinyl aliphatic compound (e. g., acrylonitrile, vinyl esters, acrylic esters, acrylamide, etc.) or a vinyl aromatic compound (e. g., styrene, the methylstyrenes, etc.), ethylene glycol fumarate, diethylene glycol maleate, etc., and mixtures of such unsaturated materials in any proportions.

Many different vinyl compounds were known prior to my invention, but to the best of my knowledge and belief N-vinyl-2-oxazolidone heretofore has been unknown. It has the formula

I

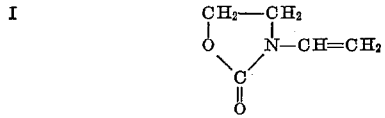

from which it will be seen that it is a cyclic carbamate. Surprisingly it can be polymerized to yield polymers which appear to have some solubility in both polar and non-polar solvents, more particularly in both water and benzene. From the structural formula it will be seen that it does not contain a hydrogen atom attached to a carbon atom adjacent to a carbonyl grouping, which latter may stem from such groupings as are present in a ketone, an aldehyde, an ester, an acid or an amide. Such hydrogen atoms constitute a point of attack, in many types of compounds, for oxidation to take place and, also, undesired side reactions. As a result, N-vinyl-2-oxazolidone lends itself readily to homopolymerization and copolymerization reactions under a wide variety of conditions.

Another advantage flowing from the use of N-vinyl-2-oxazolidone in copolymerization reactions accrues from its particular solubility, miscibility and boiling point characteristics. Consequently it lends itself readily to copolymerization reactions, following ordinary techniques, with a wider variety of copolymerizable substances than are generally found in the average vinyl monomer. The advantages of this will be immediately apparent to those skilled in the art.

N-vinyl-2-oxazolidone is produced with no unusual difficulty from relatively cheap raw materials. This is a very practical advantage residing in this new vinyl monomer, which fact will be immediately appreciated by those skilled in the art.

N-vinyl-2-oxazolidone can be prepared, for example, by the dehydrochlorination of N-(β-chloroethyl)-2-oxazolidone as described more fully later herein.

It is an object of the present invention to provide a new polymerizable monomer, specifically N-vinyl-2-oxazolidone.

It is another object of the invention to prepare a new homopolymer and class of copolymers for use in industry.

Another object of the invention is to provide polymerizable or potentially polymerizable molding and other compositions which can be handled without difficulty prior to and during fabrication.

Still another object of the invention is to prepare synthetic materials which are particularly useful as coating, impregnating, adhesive, laminating and similar compositions, and as components of such compositions.

Another object of the invention is to prepare molding compositions from which can be produced clear, molded or translucent molded articles having a wide variety of domestic and industrial applications.

Another object of the invention is to prepare clear and colorless cast articles, as well as laminated moldings having high strength characteristics combined with other desirable properties.

Other objects of the invention will be apparent to those skilled in the art from the description and examples which follow.

These objects are accomplished, in general, by preparing N-vinyl-2-oxazolidone and by polymerizing it alone or while admixed with one or more (e. g., two, three, five or any desired number) of other unsaturated substances which are copolymerizable therewith, examples of which have been given hereinbefore. The homopolymer or copolymer advantageously is produced, for instance, by polymerizing N-vinyl-2-oxazolidone alone or a mixture thereof with one or more other unsaturated materials under heat and with the aid of a polymerization catalyst or catalysts. In certain cases, for example, when acrylonitrile is the unsaturated material that is copolymerized with the N-vinyl-2-oxazolidone, the polymerization can advantageously be effected in an aqueous medium, with the aid of a polymerization catalyst or catalysts; and, at the end of the polymerization period, isolating the resulting copolymer.

Examples of monomers containing a $CH_2=C<$ grouping that can be copolymerized with a compound of the kind embraced by Formula I, which are different therefrom, and which can be polymerized either singly or a plurality (two, three, four or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e. g., methacrylic, ethacrylic, propacrylic, etc., and arylacrylic, e. g., phenylacrylic, etc.), crotonic, oxalic, malonic, succinic, glutaric, adipic, pimelic, suberic, azelaic, sebacic, maleic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e. g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e. g., styrene, o-, m- and p-chlorostyrenes, -bromostyrenes, -fluorostyrenes, -methylstyrenes, -ethylstyrenes, -cyanostyrenes, the various poly-substituted styrenes such, for example, as the various di-, tri- and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyldibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e. g., alpha-methyl styrene, alpha-methyl-para-methyl styrene, etc.; unsaturated ethers, e. g., ethyl vinyl ether, diallyl ether, ethyl methallyl ether, etc.; unsaturated amides, for instance N-allyl caprolactam, acrylamide, and N-substituted acrylamides, e. g., N-methylol acrylamide, N-allyl acrylamide, N-methyl acrylamide, N-phenyl acrylamide, etc.; unsaturated ketones, e. g., methyl vinyl ketone, methyl allyl ketone, etc.; methylene malonic esters, e. g., methylene methyl malonate, etc.; ethylene; butadienes, e. g., 1,3-butadiene, 2-chlorobutadiene, etc.; unsaturated polyhydric alcohol (e. g., butenediol, etc.) esters of saturated and unsaturated, aliphatic and aromatic, monobasic and polybasic acids, illustrative examples of which appear above.

Other examples of monomers that can be copolymerized with N-vinyl-2-oxazolidone are the vinyl halides, more particularly vinyl fluoride, vinyl chloride, vinyl bromide and vinyl iodide, and the various vinylidene compounds, including the vinylidene halides, e. g., vinylidene chloride, vinylidene bromide, vinylidene fluoride and vinylidene iodide, other comonomers being added if needed in order to improve the compatibility and copolymerization characteristics of the mixed monomers.

Other and more specific examples of monomeric materials which may be mixed or blended with the compound of Formula I and the resulting homogeneous or substantially homogeneous, polymerizable composition then polymerized, as hereinafter more fully described, to yield new and valuable copolymer compositions are the allyl compounds and especially those which have a boiling point of at least about 60° C. Of the monomeric materials which may be used the allyl esters form a large class, all of which are suitable. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

More specific examples of allyl compounds that can be copolymerized with the vinyl compound of Formula I are allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl azelate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetrallyl silane, tetrallyl silicate, hexallyl disiloxane, etc. Other examples of allyl compounds that may be employed are given, for example, in Kropa Patent No. 2,510,503, issued June 6, 1950.

Among the comonomers which are preferred for use in carrying my invention into effect are the vinyl compounds, including the vinyl aromatic compounds, more particularly the vinyl aromatic hydrocarbons (e. g., styrene, the various dialkyl styrenes, etc.), and the vinyl aliphatic compounds, e. g., acrylonitrile, acrylamide, etc., and other compounds containing a $CH_2=C<$ grouping, e. g., the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the methyl, ethyl, propyl, isopropyl, n-butl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the ester grouping, examples of which are given above, as well as other vinyl aromatic and vinyl aliphatic compounds, and other compounds containing either a single $CH_2=C<$ grouping or a plurality of $CH_2=C<$ groupings. Other examples are given in, for instance, Thomas and Kropa Patent No. 2,601,572, dated June 24, 1952, where examples are given both by classes and species; see, for instance, column 11, line 54, through line 35, column 12, of this patent.

Substantially insoluble, substantially infusible resins may be prepared by means of the chemical reaction or polymerization of a mixture containing a resin possessing a plurality of polymerizably reactive alpha, beta-enal groups (that is, the grouping

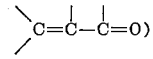

and a vinyl compound of the kind embraced by Formula I. Such mixtures may be utilized in coating compositions, molding compositions, laminating compositions, casting compositions, adhesives, etc. The resins used in such mixtures and which possess a plurality of polymerizably reactive alpha,beta-enal groups are designated herein as "reactive resins" or as "unsaturated alkyd resins." They also properly may be described as being unsaturated alkyd resins produced by reaction of ingredients comprising a polyhydric alcohol and an ethylenically unsaturated polycarboxylic compound, more particularly such a compound wherein the ethylenically unsaturated grouping is alpha to a carbonyl group.

Among the reactive resins used in practicing my invention as a reactant with a vinyl compound of the kind embraced by Formula I are those which are derived from unsaturated alpha,beta-organic acids of the aliphatic series and, therefore, contain the reactive groupings present in those acids. The terms "unsaturated alpha,beta-organic acid" and "alpha,beta-unsaturated organic acid," as commonly used in the art, do not include acids wherein the unsaturated grouping is part of an aromatic-acting radical, as for example phthalic acid, and the same definition is adopted herein. Instead of the unsaturated polycarboxylic acids, the available anhydrides thereof also may be employed in producing the unsaturated alkyd resin. The unsaturated alkyd resins are preferably produced by the esterification of an unsaturated alpha,beta-polycarboxylic acid of the aliphatic series, more particularly an alpha,beta-unsaturated polycarboxylic acid, with a polyhydric alcohol, and particularly a glycol. Although esterification of the acid with a polyhydric alcohol is perhaps one of the simplest, most convenient ways of obtaining a reactive resin, I am not precluded from using resins otherwise derived from unsaturated alpha, beta-organic acids. I also may employ a crystalline unsaturated alkyd resin obtained by the reaction of a glycol, which is completely symmetrical, with an alpha,beta-unsaturated dicarboxylic acid having a transfiguration such as fumaric acid. The unsaturated alkyd resin is preferably one having an acid number not greater than 50, although in some cases resins having an acid number as high as 100 may be employed. The term "unsaturated alkyd resin" as used herein does not include within its meaning the convention drying oil- or drying oil acid-modified alkyd resins in the preparation of which an aromatic or saturated aliphatic polycarboxylic acid or anhydride is used.

Illustrative examples of unsaturated alkyd resins that may be employed are those produced by reaction of the following ingredients: ethylene glycol and maleic anhydride; glycerine and maleic anhydride; diethylene glycol, maleic anhydride and phthalic anhydride; diethylene glycol and itaconic acid; ethylene glycol, maleic anhydride and succinic acid; ethylene glycol, maleic anhydride and tetrafluorosuccinic acid; ethylene glycol, itaconic acid and phthalic anhydride; diethylene glycol, maleic anhydride and tung oil acids; ethylene glycol, maleic anhydride, linseed oil acids and phthalic anhydride; diethylene glycol and maleic anhydride; ethylene glycol, maleic anhydride and stearic acid; diethylene glycol, maleic anhydride and decyl alcohol; ethylene glycol, maleic anhydride, octyl alcohol and acetic anhydride; diethylene glycol, fumaric acid, tetrahydroabietyl alcohol and linseed oil fatty acids; alpha-propylene glycol and maleic anhydride; diethylene glycol, fumaric acid and benzyl alcohol; diethylene glycol, fumaric acid and tetrahydroabietyl alcohol; ethylene glycol, fumaric acid and omega-hydroxydecanoic acid; diethylene glycol, fumaric acid and linseed oil fatty acid monoglycerides; etc. Reference is made to the following patents for more detailed information regarding the ingredients, the preparation, and additional examples of modified and unmodified unsaturated alkyd resins that may be copolymerized with N-vinyl-2-oxazolidone to yield new synthetic compositions having a wide variety of commercial applications: 2,409,633, 2,443,740, 2,443,741, 2,485,294, and 2,510,503.

Mixtures of any of the aforementioned polymerizable materials in any proportions may be copolymerized with N-vinyl-2-oxazolidone. For example, I may copolymerize N-vinyl-2-oxazolidone with an unsaturated alkyd resin alone, e. g., diethylene glycol maleate, etc., or, also alone, a compound containing a $CH_2=C<$ grouping (which compound is different from N-vinyl-2-oxazolidone), e. g., styrene, diallyl succinate, triallyl cyanurate, etc, or a mixture of such a resin and compound. Mixtures of different unsaturated alkyd resins and of different compounds containing a $CH_2=C<$ grouping sometimes may be employed advantageously in making a copolymer thereof with N-vinyl-2-oxazolidone.

In the production of copolymers or interpolymers, the N-vinyl-2-oxazolidone generally constitutes at least 10% by weight of the mixture of copolymerizable materials, e. g., from 10% to 90 or 95% or even as high as 98 or 99% by weight of the aforesaid mixture.

Any suitable means may be used in effecting polymerization of N-vinyl-2-oxazolidone alone or admixed with one or more other unsaturated substances which are copolymerizable therewith. Heat, light, or both heat and light, with or without a polymerization catalyst, can be used. A polymerization catalyst preferably is employed in order to shorten the period of time required for completion of the polymerization reaction. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dibutyl peroxide, dilauryl peroxide, dioleyl peroxide, distearyl peroxide, di-(tert.-butyl) peroxide and di-(tert.-amyl) peroxide, such peroxides often being designated as ethyl, propyl, butyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide catalysts that can be employed are the following:

Tetralin hydroperoxide
tert.-Butyl diperphthalate
Cumene hydroperoxide
tert.-Butyl perbenzoate
2,4-dichlorobenzoyl peroxide
Urea peroxide
Caprylyl peroxide
p-Chlorobenzoyl peroxide
2,2-bis(tert.-butyl peroxy) butane
Hydroxyheptyl peroxide
Diperoxide of benzaldehyde Other so-called "free radical" types of catalysts, e. g., $\alpha,\alpha'$-azodiisobutyronitrile, can also be used to accelerate polymerization.

If desired, the monomeric N-vinyl-2-oxazolidone or mixture of copolymerizable ingredients may be polymerized in emulsion or in solution state to yield a homopolymer or copolymer. Good results are obtained by effecting the polymerization reaction while the aforesaid ingredients are dissolved in a suitable solvent, for example water or a liquid solvent comprising mainly water. Suitable inert organic solvents also can be used if desired, e. g., benzene, toluene, xylene, etc.

The polymerization also can be effected by conventional bulk polymerization technique, in the presence or absence of a solvent capable of dissolving the polymerizable mass and in which the latter preferably is inert; or by conventional bead polymerization methods. The polymerization can be effected by a continuous process as well as by a batch operation.

The concentration of the catalyst is relatively small, e. g., from, by weight, about 1 part of catalyst per 1000 parts of the polymerizable substance to about 3 or 4 parts of catalyst per 100 parts of the said substance.

The temperature of polymerization of the polymerizable composition comprising N-vinyl-2-oxazolidone can be varied over a wide range, up to and including or slightly above the boiling point (at atmospheric pressure) of the polymerizable mass. In most cases, the polymerization temperature will be within the range of about 20° or 30° C., preferably at least 35° or 40° C., up to the boiling temperature of the polymerizable substance, depending, for example, upon the particular catalyst, if any, used, the rapidity of polymerization wanted and other influencing factors. The use of polymerization temperatures substantially above the boiling point of the aforesaid polymerizable material is not precluded, but generally is less desirable because the polymerization reaction then must either be carried out in a closed reaction vessel under pressure, or, for economical reasons, with a reflux condenser or other means provided for the recovery and re-use of the volatilized monomer or monomers if the reaction is carried out at the boiling temperature of the mass under atmospheric pressure.

If the polymerization reaction is carried out while the polymerizable material is dissolved or dispersed in a liquid medium, e. g., in solution in water, the resulting homopolymer or copolymer then is separated from the said medium by any suitable means, e. g., by filtration, centrifuging, solvent extraction, etc.

In order that those skilled in the art may better understand how the present invention can be carried into effect, the following examples are given by way of illustration and not by way of limitation. All parts and percentages are by weight.

EXAMPLE 1

This example illustrates one suitable method of preparing N-vinyl-2-oxazolidone.

A. *Preparation of N-(β-hydroxyethyl)-2-oxazolidone*

The above intermediate is prepared by reaction of equal molar proportions of diethanolamine and diethyl carbonate, which reaction may be illustrated by the following equation:

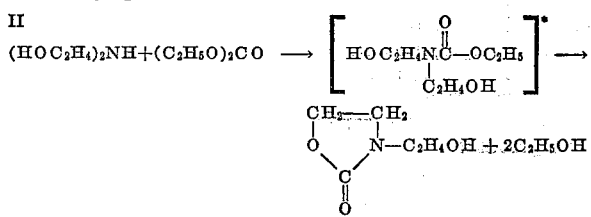

\* Intermediate not isolated.

|  | Grams |
|---|---|
| Diethanolamine | 420 |
| Diethyl carbonate | 472 |

To a reaction vessel fitted with a stirrer, thermometer, and a 10-inch Carborundum-packed column, which in turn is fitted with a variable take-off head, is charged 315 grams (3 moles) of diethanolamine and 354 grams (3 moles) of diethyl carbonate. The vessel is heated with a Glas-Col mantle and, when the pot temperature reaches 122° C., refluxing starts. The take-off rate is then adjusted to maintain a pot temperature of 110–120° C. After two hours enough ethanol has been liberated so that the additional mole of each component can be added. The reaction is then continued, maintaining a close check on the pot temperature. Throughout the reaction the take-off temperature is about 78.4° C. As the reaction approaches 75% of completion, the pot temperature gradually rises and, at 135° C., 84% of the theoretical amount of alcohol has been removed. The set-up is then altered to provide for vacuum distillation, and enough additional ethanol is removed at 90–105° C./100 mm. to provide for 95% reaction. The pressure is then gradually lowered to 10 mm. (aspirator), and the temperature is gradually raised to 135° C. (no higher). The product at this stage is a slightly hazy, light-colored mobile liquid. It is treated with decolorizing carbon and filtered hot. The yield of essentially colorless liquid, $n_D^{25}=1.4825$, is 513 g. (theory=524 g. or 98.0%). The compound boils at 162° C. at 1 mm. pressure; infrared curve, E–4923.

| Analytical | Percent C | Percent H | Percent N | Hydroxy Value |
|---|---|---|---|---|
| Calculated for C₅H₉O₃N | 45.79 | 6.92 | 10.68 | 429.0 |
| Found | 45.81 | 6.89 | 10.84 | 428.7 |

B. *Preparation of N-(β-chloroethyl)-2-oxazolidone*

The above intermediate is prepared from N-(β-hydroxyethyl)-2-oxazolidone by a reaction which may be illustrated by the following equation:

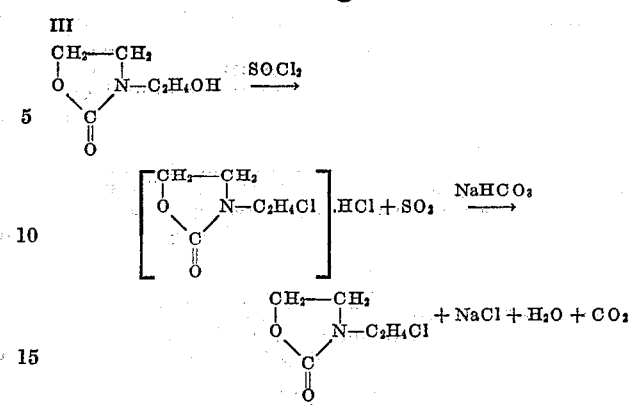

|  | Grams |
|---|---|
| N-(β-hydroxyethyl)-2-oxazolidone(crude) | 262 |
| Thionyl chloride | 238 |
| Benzene | 352 (400 ml.) |
| Sodium bicarbonate | 168 |

The N-(β-hydroxyethyl)-2-oxazolidone is charged to a suitable reaction vessel fitted with a thermometer, stirrer and Friederichs condenser. One-half (176 g.) of the benzene is added and, after a short interval of rapid stirring, a crude dispersion is obtained (the liquids are non-miscible). The previously weighed thionyl chloride is then added slowly over a three-hour period. Initially there is a slight exotherm, but once the evolution of gas has begun the temperature is easily held at 30° C. ±5° C. A strong hood is required to take care of the acidic gases that are evolved.

After approximately one-half the thionyl chloride has been added, the reaction clears, becomes homogeneous and has a light-amber color. At the end of the addition period a slow, steady stream of nitrogen is passed through the slowly stirred reaction mixture and continued for about 16 hours. During this time the reaction mixture darkens slightly and some loss of volume is noted.

The remainder (176 g.) of benzene is then added, and 168 g. NaHCO₃ is weighed out and added slowly to the reaction mixture over a 3-hour period. Initially there is a vigorous evolution of gas (CO₂) but allowance has been made for adequate "free-board" in the chosen reaction vessel employed. Moderate stirring is maintained throughout this neutralization, but after 7 hours there is still a slight evolution of CO₂. The reaction mass is again stirred for about 16 hours to insure complete removal of all free and loosely bound HCl.

At the end of this period the reaction mass is filtered, and the solid is then re-slurried in 300 ml. benzene for 15 minutes and refiltered. The combined filtrates are then treated with decolorizing carbon and again filtered. On vacuum distillation considerable water comes over with the initial benzene (water of reaction); at the same time the product acquires a slight haze. Consequently, after thorough drying, the solution being concentrated is refiltered and stripped of solvent at <50° C. (aspirator), and then finally up to 90° C. at 7 mm. for 1 hour. The product is a light, amber-colored mobile lquid; the yield is 241 g. (theory=299 g. or 80.6%); $n_D^{25}$ 1.4890. This chloro compound is used "as is" in the following dehydrochlorination step. However, the material can be readily distilled; B. P. 100° C./0.1 mm.; $n_D^{25}$ 1.4900; infrared curve E–5127.

| Analytical | Percent C | Percent H | Percent N | Percent Cl [1] |
|---|---|---|---|---|
| Calc. for C₅H₈O₂NCl | 40.15 | 5.39 | 9.37 | 23.70 |
| Found | 39.48 | 5.45 | 9.46 | 24.81 |
|  | 39.22 | 5.61 |  | 24.65 |

[1] Excess Cl corresponds to C₅H₈O₂NCl·0.058 HCl (or 1.39% HCl).

C. Preparation of N-vinyl-2-oxazolidone

N-vinyl-2-oxazolidone is prepared from N-(β-chloroethyl)-2-oxazolidone by a reaction that may be illustrated by the following equation:

IV

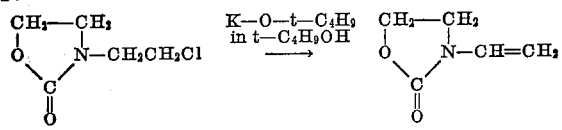

|  | Grams | Moles |
| --- | --- | --- |
| Potassium (metal) | 40 | 1.02 |
| t-Butanol | 552 (700 ml.) |  |
| N-(β-chloroethyl)-2-oxazolidone | 150 | 1.002 |

Three slugs of potassium metal (16 g. each) are transferred into a beaker of toluene to remove the mineral oil. The slugs, now free of oil, are carefully weighed into a second beaker of toluene, cutting the metal to get exactly 40 g. Meanwhile 552 g. of t-butanol has been placed in a 1-liter flask fitted with thermometer and stirrer. The potassium slugs (40 g.) are now cut (under toluene) down to the size of large peas and gradually added to the t-butanol. This requires cooling at first, but warming is needed to dissolve the last traces of metal. A carefully weighed sample of the clear solution is then titrated to a phenolphthalein end point. The total solution contains 570 g.+.00171 eq./g.=0.975 equivalents K–O–t–$C_4H_9$. To this, 25 ml. of a previously prepared 1.14 N solution of K–O–t–$C_4H_9$ is added, so that the final solution contains exactly 1.00 equivalent of base.

The 1-liter reaction flask is fitted with a reflux condenser and a dropping funnel containing the carefully weighed N-(β-chloroethyl)-2-oxazolidone. The t-butanol solution is then warmed on a steam-bath to 60° C., and the addition of chloro compound is begun. Insoluble potassium chloride separates immediately and the exotherm reaction carries the temperature to reflux (85° C.). The addition is continued, maintaining gentle reflux over a 2.5-hour period. This reaction mixture is stirred gently at reflux for about 20 hours. At the end of this time a carefully weighed sample of the reaction slurry is titrated as before and the results indicate the reaction to be 88% complete.

The reaction mass is then filtered or it can be centrifuged to isolate the solid. The solid is re-slurried twice with 250 ml. benzene and again filtered and washed with additional benzene. The filtrates and washings are combined, treated with decolorizing carbon and again filtered. An additional 500 ml. benzene is now added to the essentially colorless solution and stripping of solvent begun, keeping the pot temperature below 50° C. with the help of an aspirator. During this time a pinch of hydroquinone is added as an inhibitor. The dark crude solvent-free N-vinyl-2-oxazolidone weighs 90 g. (theory=113 or 79.6%). On distillation 46 g. of product boiling sharply at 70° C./0.1 mm. is recovered. An iodine value determination (bromide-bromate method) gives a value of 201 (theory=224); this indicates a purity of 90%. Infrared curve F-5389 shows strong absorption at 1620 cm.$^{-1}$. A small sample of this N-vinyl-2-oxazolidone is cooled with Dry Ice. When the temperature reaches −32° C. crystallization begins and the heat of fusion carries to −15° C. Hence the melting point is about −15° C.; $n_D^{25}$ 1.4939.

EXAMPLE 2

One hundred (100) parts of N-vinyl-2-oxazolidone is allowed to stand undisturbed for several days at room temperature (20°–30° C.). The material is polymerized at the end of this period of time to a clear, solid, orange-colored mass. This polymer is soluble in water.

EXAMPLE 3

One hundred (100) parts of N-vinyl-2-oxazolidone containing 2 percent by weight of benzoyl peroxide is maintained at a temperature of 30° C. for several hours. The resulting liquid is considerably more viscous than the starting material, indicating that polymerization of the monomer has taken place.

EXAMPLE 4

To 100 parts of N-vinyl-2-oxazolidone is added 2 parts of alpha,alpha'-azodiisobutyronitrile as a polymerization catalyst. The mixture is heated to 80° C. The monomer polymerizes almost immediately to a clear, tough, tacky, orange-colored resin.

EXAMPLE 5

One hundred (100) parts of N-vinyl-2-oxazolidone is subjected to ultraviolet light for 24 hours. The resulting mass is more viscous than the starting material, indicating that polymerization has occurred. The resulting polymerization product is light colored.

EXAMPLE 6

To 11 parts of N-vinyl-2-oxazolidone is added 44 parts of redistilled acrylonitrile. The two liquids are completely miscible. To the resulting mixture is added 2 parts of alpha,alpha'-azodiisobutyronitrile, and the mixture is then placed in an oven maintained at 60° C. The resulting copolymer of acrylonitrile and N-vinyl-2-oxazolidone is a colorless or nearly colorless solid mass.

EXAMPLE 7

|  | Parts |
| --- | --- |
| N-vinyl-2-oxazolidone | 20.0 |
| Ethyl acrylate | 30.0 |
| Benzene | 50.0 |
| Benzoyl peroxide | 0.5 | are heated together under reflux at the boiling temperature of the mass for 5 hours. The resulting viscous solution containing a copolymer of ethyl acrylate and the aforementioned oxazolidone is cooled, and the content of copolymer solids is determined by oven drying for 2 hours at 150° C. The yield of copolymer solids is about 40%. Films dried from the benzene solution of the copolymer are clear and tough. The copolymer of this example is suitable for use as a component of coating compositions.

Instead of ethyl acrylate other comonomers, more particularly other esters of acrylic acid, e. g., methyl acrylate, propyl acrylate, isopropyl acrylate, n-butyl acrylate, isobutyl acrylate, sec.-butyl acrylate, tert.-butyl acrylate, amyl acrylate, hexyl acrylate, propenyl acrylate, cyclohexyl acrylate, phenyl acrylate, benzyl acrylate, etc., can be substituted in the above formulation thereby to obtain copolymer compositions of varying properties. As with ethyl acrylate, so too with such other comonomers the proportions of components can be varied as desired or as conditions may require, e. g., from 3 to 97 (or higher) molar percent of the N-vinyl-2-oxazolidone to from 97 to 3 (or lower) molar percent of the other comonomer.

EXAMPLE 8

|  | Parts |
| --- | --- |
| Styrene | 180.0 |
| N-vinyl-2-oxazolidone | 20.0 |
| 25% solution of dioctyl sodium sulfosuccinate in water | 20.0 |
| Water | 580.0 |
| Ammonium persulfate | 0.1 | are charged to a 3-necked reaction vessel equipped with a stirrer and a reflux condenser. The mixture is stirred vigorously while heating on a steam bath for 80 minutes, at the end of which period refluxing has ceased. Steam is now passed through the emulsion for 15 minutes to remove residual monomers. A small amount of coagulated copolymer is filtered out of the stable emulsion of the copolymer of styrene and the aforementioned oxazolidone.

The copolymer latex may be used as a coating composition or as a component of such compositions. For example, it may be applied to a surface of glass, metal, wood or other material to be protectively finished, and the coated article then heated for from 1 to 3 hours at a temperature of the order of 120° C. to 140° C. to evaporate the water and to solidify the coating thereon.

The copolymer may be precipitated, if desired, from the aqueous emulsion thereof by adding a coagulating agent such as, for instance, as salts (e. g., salts of polyvalent metals such as aluminum sulfate, magnesium chloride, barium chloride, etc., salts of monovalent metals such as sodium chloride, sodium sulfate, etc.), acids, e. g., formic acid, acetic acid, phosphoric acid, hydrochloric acid, etc., sulfides, e. g., magnesium sulfide, etc. The coagulated copolymer is separated from the aqueous phase, water-washed, and freed from entrapped water, for example by working on rolls to press out the water, followed by drying at a suitable temperature (e. g., at room temperature) under atmospheric pressure (preferably in a stream of dry air) or at subatmospheric pressures to remove the last traces of water. The dried copolymer, alone or with a dye, pigment, filler, plasticizer, lubricant, polymerization catalyst or other modifying agent, may be molded under heat and pressure, e. g., at 140° C. to 170° C. and under a pressure of 2000 to 5000 pounds per square inch.

EXAMPLE 9

| | Parts |
|---|---|
| N-vinyl-2-oxazolidone | 50 |
| 2,5-dichlorostyrene | 150 |
| α,α'-Azodiisobutyronitrile | 2 | are mixed and the monomers copolymerized by heating the mixture at 60° C. for 72 hours, yielding a solid copolymer.

EXAMPLE 10

| | Parts |
|---|---|
| Diallyl tetrafluorosuccinate | 190 |
| Triallyl cyanurate | 5 |
| N-vinyl-2-oxazolidone | 5 |
| α,α'-Azodiisobutyronitrile | 2 | are heated together for 3 hours at 105° C., yielding an insoluble copolymeric solid. This copolymer supports combustion less readily, that is, it burns more slowly, than polymeric (homopolymeric) diallyl succinate, and is suitable for uses, e. g., in electrically insulating applications, in making flame-resistant laminated articles, etc., for which polymeric diallyl succinate would be either wholly unsuited or would have only limited utility.

EXAMPLE 11

| | Parts |
|---|---|
| N-vinyl-2-oxazolidone | 5.0 |
| Methyl acrylate | 22.5 |
| Ethyl acrylate | 22.5 |
| 25% solution of dioctyl sodium sulfosuccinate in water | 10.0 |
| Water | 190.0 |
| 30% aqueous solution of hydrogen peroxide | 0.55 |

The same general procedure is followed as described under Example 8. Stirring and heating under reflux are continued for 4½ hours, after which the emulsion is steamed for 1 hour to remove unpolymerized monomers. The resulting product is a fairly stable emulsion of reactive copolymer, which may be used, for example, as a coating composition or as a component of such compositions.

EXAMPLE 12

| | Parts |
|---|---|
| N-vinyl-2-oxazolidone | 25.0 |
| Acrylonitrile | 25.0 |
| α,α'-Azodiisobutyronitrile | 0.5 | are mixed together and charged to a heavy-walled glass tube, which thereafter is sealed under vacuum. Copolymerization is effected by heating the sealed tube in a 60° C. water bath for 40 hours. The resulting copolymer can be molded under heat and pressure to yield a wide variety of molded articles for domestic and industrial uses.

EXAMPLE 13

| | Parts |
|---|---|
| N-vinyl-2-oxazolidone | 25.0 |
| Methyl methacrylate | 25.0 |
| α,α'-Azodiisobutyronitrile | 0.5 |

The same procedure is followed as described under Example 12 with the exception that the period of heating in the 60° C. bath is only 18 hours instead of 40 hours. A hard copolymer of methyl methacrylate and N-vinyl-2-oxazolidone is obtained.

EXAMPLE 14

| | Parts |
|---|---|
| N-vinyl-2-oxazolidone | 25.0 |
| Vinyl acetate | 25.0 |
| α,α'-Azodiisobutylronitrile | 0.5 | yield a hard copolymer when copolymerized in the same manner as described under Example 13.

EXAMPLE 15

| | Parts |
|---|---|
| N-vinyl-2-oxazolidone | 25.0 |
| Vinylidene chloride | 25.0 |
| α,α'-Azodiisobutyronitrile | 0.5 | yield a clear, homogeneous, pale yellow copolymer when copolymerized in the same manner as described under Example 13.

EXAMPLE 16

| | Parts |
|---|---|
| N-vinyl-2-oxazolidone | 7.5 |
| Vinylidene chloride | 142.5 |
| α,α'-Azodiisobutyronitrile | 1.5 | are mixed and heated together in a closed vessel for 24 hours at 40° C., yielding a white, opaque, powdery, solid, thermoplastic copolymer of vinylidene chloride and N-vinyl-2-oxazolidone. This copolymer can be hot drawn to obtain monofilaments, rods, bars, tubes, etc., having a wide variety of commercial uses.

EXAMPLE 17

One hundred (100) grams of acrylamide, 30 grams of N-vinyl-2-oxazolidone and 10 ml. of 30% hydrogen peroxide are added to 500 ml. of distilled water. The polymerization of the mixture is carried out at 60° C. for 48 hours. The water-soluble copolymer which forms is precipitated by pouring the reaction mass into methanol. The resinous product is washed with methanol and dried.

Instead of acrylamide, an equivalent amount of methacrylamide can be substituted to obtain the corresponding resinous methacrylamide copolymer.

The above copolymers, and especially their formaldehyde-reaction products, are particularly useful in textile-sizing, adhesive, paper, soil-conditioning and soil-stabilization compositions and applications.

EXAMPLE 18

A mixture comprising 25 parts of ethylene diethylene glycol fumarate, 25 parts of N-vinyl-2-oxazolidone and 0.5 part of benzoyl peroxide containing 50% inactive filler (triphenyl phosphate) is poured into a mold and cured for about 12 hours at 60° C. and one hour at 100° C. The cured casting is clear, hard, and free from fractures. The above alkyd resin is made from ethylene glycol, diethylene glycol and fumaric acid.

EXAMPLE 19

Thirty (30) parts of ethylene glycol fumarate sebacate (4:3:1 molar ratio) are mixed with 10 parts of N-vinyl- 2-oxazolidone. To 12 parts of the resulting mixture are added 8 parts of wood flour filler and 2 parts of benzoyl peroxide containing 50% inactive filler (triphenyl phosphate). The resulting mixture is compacted by passage through cold rolls and disintegrated, and this composition then placed in a disk mold preheated to 140° C. and left there under a pressure of about 3,000 pounds per sq. in. for about 20 minutes. The resulting molding is hard and well-cured.

EXAMPLE 20

A uniform mixture of 25 parts of ethylene glycol fumarate sebacate (4:3:1 molar ratio), 10 parts of N-vinyl-2-oxazolidone and 0.4 part of benzoyl peroxide is spread evenly between five plies of ECC–11–112 Fiberglas cloth and the combination is held under slight pressure in a Carver press for about 40 minutes at about 150° C. The resinous copolymer component of the impregnated Fiberglas cloth becomes hard and the panel stiff.

EXAMPLE 21

The resin mixture of Example 20 is spread evenly between six plies of #720 paper, and the combination is subjected to the same curing conditions as the Fiberglas laminate of Example 20. The resulting panel is stiff, and the paper laminate is well cured.

EXAMPLE 22

Sixty-seven (67) parts of diethylene glycol fumarate sebacate (6:5:1 molar ratio), 33 parts of N-vinyl-2-oxazolidone, 7 parts of paraformaldehyde and 0.5 part of benzoyl peroxide containing 50% inactive filler (triphenyl phosphate) are thoroughly mixed together in a suitable vessel and then heated at 100° C. A vigorous reaction occurs, accompanied by evolution of gas. As the mass polymerizes and sets, it undergoes about a twofold expansion and the cured mass is porous.

EXAMPLE 23

A substantially homogeneous mixture is made of 25 parts of N-vinyl-2-oxazolidone and 50 parts of an unsaturated alkyd resin produced by reaction of the following reactants in the specified molar ratios:

|  | Molar ratio |
| --- | --- |
| Propylene glycol | 6.6 |
| Phthalic anhydride | 4.0 |
| Fumaric acid | 2.6 |

The reaction between the alkyd-forming reactants is carried out in the presence of 0.008% of hydroquinone based on the weight of the alkyd.

To the mixture of the aforementioned oxazolidone and unsaturated alkyd resin is added 0.5 part of a polymerization catalyst comprising 60% methyl ethyl ketone hydroperoxide and 40% dimethyl phthalate as a solvent therefor; and, also, 0.2 ml. cobalt naphthenate solution, which is a xylene solution of cobalt naphthenate containing 2% cobalt as the metal.

A sample of the polymerizable composition produced as above described is heated at 70° C. for about 16 hours, yielding a hard copolymer of the unsaturated alkyd resin and N-vinyl-2-oxazolidone.

EXAMPLE 24

Same as in Example 23 with the exception that the unsaturated alkyd resin is one which is produced by reaction of the following reactants in the specified molar ratios:

|  | Molar ratio |
| --- | --- |
| Propylene glycol | 6.6 |
| Phthalic anhydride | 1.1 |
| Fumaric acid | 5.5 | and 1.0 part of the same catalyst used in Example 23 is employed. The reaction between the alkyd-forming reactants is carried out in the presence of 0.06% of di-(tert.-butyl) hydroquinone based on the weight of the original reactants forming the alkyd resin.

A sample of the polymerizable composition is heated on a steam bath at 100° C. A hard, opaque copolymer of the unsaturated alkyd resin and the N-vinyl-2-oxazolidone is obtained after 45 minutes heating.

EXAMPLE 25

A substantially homogenous mixture is made of 20 parts of N-vinyl-2-oxazolidone and 60 parts of an unsaturated alkyd resin produced by reaction of the following reactants in the specified molar ratios:

|  | Molar ratio |
| --- | --- |
| Ethylene glycol | 6.6 |
| Phthalic anhydride | 1.1 |
| Fumaric acid | 5.5 |

The reaction between the alkyd-forming reactants is effected in the presence of 0.06% of di-(tert.-butyl) hydroquinone based on the weight of the original reactants forming the alkyd resin.

To the mixture of the oxazolidone and unsaturated alkyd resin is added 1.0 gram of the same polymerization catalyst employed in Examples 23 and 24, and 0.2 ml. of the same cobalt naphthenate solution. The resulting mixture yields a hard, opaque copolymerization product after heating on a steam bath at 100° C. for about 2 hours.

EXAMPLE 26

A substantially homogeneous mixture is made of 20 parts of N-vinyl-2-oxazolidone and 60 parts of the same unsaturated alkyd resin used in Example 23. To the mixture of the oxazolidone and the unsaturated alkyd resin is added 1.0 part of the same polymerization catalyst employed in Examples 23, 24 and 25, and 0.2 ml. of the same cobalt solution. The resulting mixture yields a hard copolymer after heating for about 3 hours on a steam bath at 100° C.

EXAMPLE 27

A substantially homogeneous mixture is made by warming together, on a steam bath, with stirring 15 parts of N-vinyl-2-oxazolidone and 35 parts of an unsaturated alkyd resin produced by reaction of the following reactants in the specified molar ratios:

|  | Molar ratio |
| --- | --- |
| Propylene glycol | 6.6 |
| Maleic anhydride | 4.0 |
| Phthalic anhydride | 2.6 |

The reaction between the alkyd-forming reactants is carried out in the presence of 0.008% of hydroquinone based on the weight of the alkyd.

To each of 10-part portions of the clear, viscous polymerizable composition comprising the above mixture added thereto, in one case, (a) 0.2 part of a solution of 50% benzoyl peroxide in tricresyl phosphate and (b) 0.1 part of alpha,alpha'-bis-azoisobutyronitrile (also known as alpha,alpha'-azodiisobutyronitrile). Each of the solutions is heated in a reaction vessel on a 102° C. oil bath. Both of the catalyzed polymerizable compositions set to gels after heating for about 5–10 minutes, and both are suitable for use as casting resins. The composition containing the azo catalyst sets more rapidly than the other.

It will be understood, of course, by those skilled in the art that my invention is not limited to the specific ingredients named in the above illustrative examples nor to the particular proportions and methods of polymerization and copolymerization mentioned therein.

The thermosetting or potentially thermosetting polymerization products (polymer and copolymers) of this invention have a wide variety of applications. For instance, with or without a filler or other additive, numerous examples of which have been given hereinbefore, they may be used as molding composition (or as components of molding compositions) from which molded articles are produced by molding the composition under heat and pressure, e. g., at temperatures of the order of 120° to 200° C. and under pressures ranging between 1,000 and 10,000 pounds per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The liquid polymerizable compositions of my invention also can be used in the production of castings; as adhesives, for instance in the production of optical devices containing a plurality of elements, examples of which are compound lenses, compound prisms, Nicol prisms, etc.; in the treatment of paper or paper stock; and for various other purposes including those mentioned in some of the specific examples.

In my copending divisional application Serial No. 481,711, filed January 13, 1955, claims are made to new and useful polymerizable compositions comprising N-vinyl-2-oxazolidone and a polymerizable unsaturated alkyd resin containing a plurality of polymerizably reactive alpha, beta-enal groups, to products and articles comprising the polymerized composition, and also to method features.

I claim:

1. N-vinyl-2-oxazolidone.
2. A polymer of N-vinyl-2-oxazolidone.
3. A homopolymer of N-vinyl-2-oxazolidone.
4. A polymerizable composition comprising (1) N-vinyl-2-oxazolidone and (2) a compound which is different from the compound of (1), is copolymerizable therewith and which contains a $CH_2=C<$ grouping.
5. A composition comprising a copolymer of copolymerizable ingredients including (1) N-vinyl-2-oxazolidone and (2) a compound which is different from the compound of (1), is copolymerizable therewith and which contains a $CH_2=C<$ grouping.
6. A composition as in claim 5 wherein the compound of (2) is a vinyl compound.
7. A composition as in claim 6 wherein the vinyl compound is a vinyl aromatic compound.
8. A composition as in claim 7 wherein the vinyl aromatic compound is styrene.
9. A composition as in claim 6 wherein the vinyl compound is a vinyl aliphatic compound.
10. A composition as in claim 9 wherein the vinyl aliphatic compound is acrylonitrile.
11. A composition as in claim 9 wherein the vinyl aliphatic compound is acrylamide.
12. A composition as in claim 9 wherein the vinyl aliphatic compound is an alkyl ester of acrylic acid.
13. A shaped article comprising a filler and a copolymer of copolymerizable ingredients including (1) N-vinyl-2-oxazolidone and (2) a compound which is different from the compound of (1), is copolymerizable therewith and which contains a $CH_2=C<$ grouping.
14. A laminated article comprising a plurality of sheets of fibrous material bonded together with a copolymer of copolymerizable ingredients including (1) N-vinyl-2-oxazolidone and (2) a compound which is different from the compound of (1), is copolymerizable therewith and which contains a $CH_2=C<$ grouping.
15. The method of preparing a new synthetic composition which comprises polymerizing N-vinyl-2-oxazolidone under heat while admixed with a polymerization catalyst.
16. The method of preparing a new synthetic composition which comprises polymerizing, under heat and while admixed with a polymerization catalyst, a polymerizable composition comprising (1) N-vinyl-2-oxazolidone and (2) a compound which is different from the compound of (1), is copolymerizable therewith and which contains a $CH_2=C<$ grouping.
17. The method of preparing N-vinyl-2-oxazolidone which comprises dehydrochlorinating N-(beta-chloroethyl)-2-oxazolidone by contacting the said N-(beta-chloroethyl)-2-oxazolidone with potassium tertiary-butoxide.
18. The method of preparing N-vinyl-2-oxazolidone which comprises reacting N-(beta-hydroxyethyl)-2-oxazolidone with thionyl chloride to form N-(beta-chloroethyl)-2-oxazolidone; and dehydrochlorinating the said N-(beta-chloroethyl)-2-oxazolidone by contacting it with potassium tertiary-butoxide.

References Cited in the file of this patent

UNITED STATES PATENTS

| | | |
|---|---|---|
| 1,864,884 | Bauer | June 28, 1932 |
| 2,399,118 | Homeyer | Apr. 23, 1946 |
| 2,522,501 | Brooks et al. | Sept. 19, 1950 |
| 2,541,152 | Cairns | Feb. 13, 1951 |
| 2,643,990 | Ham | June 30, 1953 |
| 2,656,328 | Caldwell | Oct. 20, 1953 |

U. S. DEPARTMENT OF COMMERCE
PATENT OFFICE

CERTIFICATE OF CORRECTION

Patent No. 2,818,362            December 31, 1957

Erhart K. Drechsel

It is hereby certified that error appears in the printed specification of the above numbered patent requiring correction and that the said Letters Patent should read as corrected below.

Column 2, line 60, for "alphatic" read --aliphatic--; column 4, line 21, for "n-butl" read --n-butyl--; column 5, lines 10 and 11, for "convention" read --conventional--; column 9, line 31, for "570 g. +" read --570 g. x --; column 14, line 55, before "added" insert --are--; line 74, for "composition" read --compositions--.

Signed and sealed this 1st day of April 1958.

(SEAL)
Attest:

KARL H. AXLINE            ROBERT C. WATSON
Attesting Officer            Commissioner of Patents